Jan. 27, 1948.  W. P. MASON  2,434,945

DIRECTION FINDING INSTRUMENT

Filed June 18, 1943

INVENTOR
W. P. MASON.
BY
ATTORNEY

Patented Jan. 27, 1948

2,434,945

UNITED STATES PATENT OFFICE 2,434,945

DIRECTION FINDING INSTRUMENT

Warren P. Mason, West Orange, N. J., assignor to Bell Telephone Laboratories, Incorporated, New York, N. Y., a corporation of New York Application June 18, 1943, Serial No. 491,277

5 Claims. (Cl. 177—386)

This invention relates to direction-finding instruments and particularly to means for operating such instruments with great accuracy.

There are known in the prior art prismatic compressional wave receivers which are prismatically responsive to different frequencies. By means of such devices a single frequency will be detected from a source which transmits a wide band of frequencies all of substantially equal intensity, and this single frequency will be in accordance with the position of the source with respect to the position of said receiver. Thus the angle of approach of the wide band of frequencies transmitted by the source may be determined by the particular one of such frequencies detected by the prismatic receiver.

The prismatic receiver, however, does not respond quite so simply as above stated. Actually the response may be depicted by a major or pronounced lobe centering about the said particular frequency and a plurality of minor lobes at each side thereof. There will be just at each side of the major lobe a not inconsiderable minor lobe and these two will be equally spaced therefrom and of equal intensity.

Now the tip end of the very sharpest lobe is somewhat flat so that tuning of a receiver to the very center thereof to get maximum response is, even in the hands of an expert operator, a difficult operation. It is the object of the present invention to increase the accuracy of observations made by such a prismatic receiving device.

In accordance with the present invention a lobe comparison method is used to more accurately locate the true center line of the major lobe. A receiver is used which is provided with two sharply tuned filters whose frequencies are equally spaced to each side of the main frequency, and the receiver is tuned until equal responses are received through each said filter.

If the spacing of the two receiving filters is narrow and the breadth of the received signal is fairly broad, the measurement through the two filters will be of side portions of the main lobe of the received signal and based on the knowledge that the lobe is symmetrical; the centerline of such lobe will be half way between the frequencies of the two filters when the responses therethrough are equal.

As an alternative arrangement the spacing of the two filters may be fairly broad while the breadth of the main lobe of the received signal is fairly narrow. In this case the response of the two filters will be to the first minor lobes and based on the knowledge that the lobe pattern is symmetrical, the centerline of the main lobe will be exactly half way between the frequencies of the two filters when the responses therethrough are equal.

In accordance with the present invention, means are provided to compare portions of the incoming signal to each side of the centerline of a major lobe, so that when a reading has been obtained showing equal responses, it will be known that such reading indicates a tuning to the very center of the tip of the major lobe and the response will be far more definite than any reading of the maximum of the major lobe.

In accordance with the present invention, the response of a prismatic receiver is affected by a modulator controlled by a variable source of frequency so that two separate and distinct frequencies may be generated differing in frequency by a given amount and representing in strength the respective strengths of the received signal at such frequency separation. Such derived frequencies are then filtered and rectified to operate a differentially connected instrument whose response will then indicate the comparison in strength of the received signals, either sides of a major lobe or peaks of two minor lobes.

The tuning is then actually to the maximum response of the major lobe but this maximum response is located by observation and comparison of the sides of a major lobe or by observation and comparison of the first and closest minor lobes.

A feature of the invention is the method of locating a particular frequency which consists of finding two different frequencies of equal intensity which are at either side of the said particular frequency and equidistant therefrom.

Other features will appear hereinafter.

The drawings consist of a single sheet having five figures, as follows.

Figure 3:
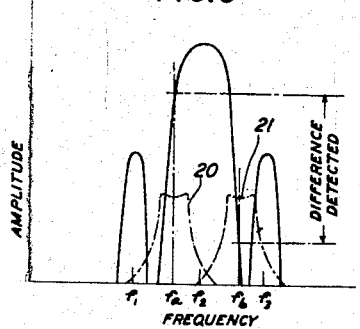
Figure 4:
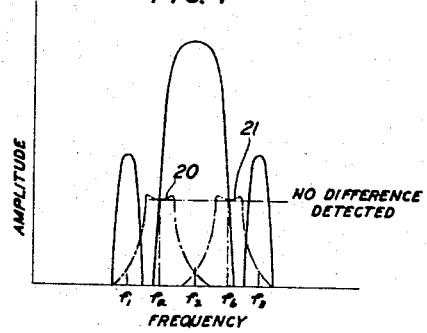
Figure 5:
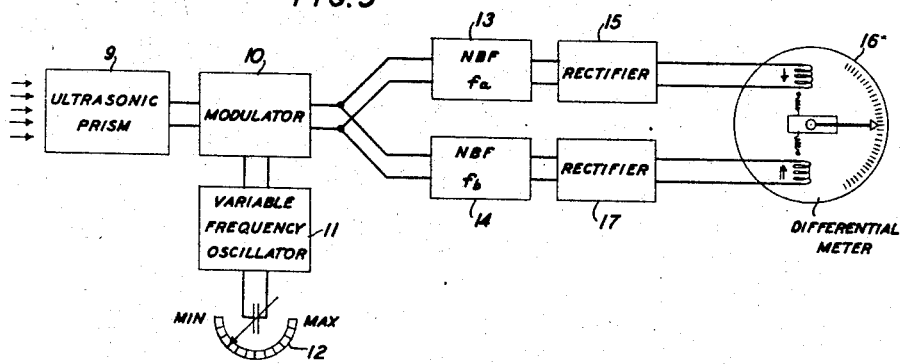

Figs. 3 and 4 are similar graphical representations in which the frequencies of the filters are brought nearer together so that the sides of the major lobe may be measured rather than the peaks of the minor lobes, Fig. 3 illustrating the relationship between receiver and incoming signal when the receiver is improperly adjusted, and Fig. 4 illustrating the same relationship when the receiver is properly adjusted; and Fig. 5 is a schematic circuit diagram showing how the known patterns of signals may be used to more accurately determine the frequency of the main lobe of an incoming signal.

It is well known that where a particular frequency of signal is transmitted from a projector, such as a radio transmitter or an underwater signaling device and especially in the ultrasonic range, that the intensity of the signal in terms of its frequency may be plotted in the form of a major lobe 1 and a greater or lesser number of minor lobes 2, 3, 4 and 5. Usually the minor lobes may be disregarded since the major lobe may be easily distinguished by its intensity by an operator receiving the signal. However, the major lobe has a comparatively broad front so that determination of its exact frequency is somewhat difficult as the intensity of the incoming signal seems to be of practically equal intensity over a considerable range. An expert operator may by careful manipulation of his receiving instrument be able to approximate the center-point of the signal and thus arrive at a fairly accurate determination.

The present invention is based on the fact that this lobe pattern is symmetrical so that the intensity of the signal at any two points equidistant from the exact center of the major lobe is equal, whether the signal at such points be the sides of the major lobe or the peaks of minor lobes. These minor lobes, though of less intensity than the major lobe, are nevertheless distinguishable and are of equal intensity and are considerably sharper so that if their frequencies can be determined, the frequency of the major lobe is determined as being exactly half way between them. Thus, in Fig. 2 the frequency $f_2$ of the major lobe 6 may be determined as being half way between the frequencies $f_1$ and $f_3$ of the minor lobes 7 and 8.

Now in certain signalling work a device known as a prism is used. This is a receiver which gives a prismatic response, that is, an incoming signal will be characterized by the fact that the maximum response will be of a certain frequency and the frequency thus detected will be a measure of the angle of approach of the signal. Usually the output of the receiver is passed through a modulator controlled by a variable frequency oscillator so that the signal is reduced to a known frequency to which certain further receiving apparatus will respond. As the variable oscillator is manipulated over its range a point will be found where the response is a maximum, whereupon the setting of the variable oscillator may be readily translated into a reading of the frequency detected and therefrom the direction of the incoming signal may be determined.

In the present arrangement, as shown in Fig. 5, the rectangle 9 represents a prismatic receiver. This is connected to a modulator 10 which is controlled by a variable frequency oscillator 11 whose variation means may operate a pointer over a scale 12. This scale may be calibrated in any desired manner, either to read the frequency of the major lobe or to read directly the angle of approach of the incoming wave.

Figure 1:
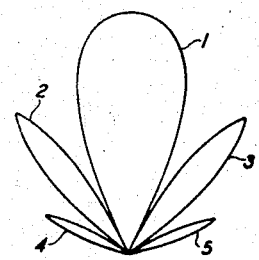
Fig. 1 is the familiar lobe pattern of a directional transmitter.
Figure 2:
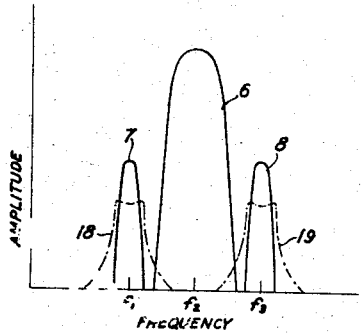
Fig. 2 is a similar pattern in the form of a graph plotted between amplitude of signals and the frequency thereof as determined by a receiver, with a graph in dot and dash lines superimposed thereon showing the pattern of the response characteristics of the receiver employed herein and showing the relation between the incoming signal and such receiver when properly adjusted.

The output of the modulator 10 feeds into a multiple path leading through two sharply tuned narrow band filters 13 and 14 which differ by the difference between the frequencies $f_1$ and $f_3$ of Fig. 2. The output of filter 13 is rectified by a rectifier 15 and fed into one coil of a differential meter 16 and the output of filter 14 is rectified by a rectifier 17 and fed into the other coil of the differential meter 16. This meter will plainly indicate equal currents in its two coils so that when a frequency of an incoming signal is to be determined the variable frequency oscillator 11 is adjusted until the meter 16 reads equality of response through the two filters 13 and 14. Since the two filters 13 and 14 are arranged to pass frequencies derived by the modulator 10 from the minor lobes such as 7 and 8, the scale 12 of the variable frequency oscillator 11 may read directly the frequency of the major lobe such as 6. Since it is only when the variable frequency oscillator 11 is exactly set that the minor lobes will appear to be of equal intensity, the reading of the scale 12 will be of greater accuracy than by any known prior art arrangement.

There is shown in Fig. 2 in dot and dash lines two substantially flat-topped lobes 18 and 19 which represent the characteristics of the narrow band-pass filters 13 and 14, respectively, and the diagram is drawn to represent the conditions obtained when perfect adjustment of the receiver is made. In this condition the centerlines of the characteristics 18 and 19 will coincide with the centerlines of the minor lobes 7 and 8 and thus determine the centerline of the major lobe 6. The effect of the adjustment of the variable frequency oscillator is to cause an apparent sidewise movement of the incoming signals with respect to the characteristics 18 and 19 until the conditions illustrated are achieved by observation of the differential meter 16. Thereupon the scale 12 will read the frequency of the major lobe 6.

In Figs. 3 and 4 the characteristics 20 and 21 correspond to the characteristics 18 and 19, respectively, only in this case they are located much closer together so that when perfect adjustment as illustrated in Fig. 4 is obtained the frequencies passed by the band-pass filters 13 and 14 are no longer the frequencies $f_1$ and $f_3$ of the minor lobes but frequencies $f_a$ and $f_b$ derived from the sides of the major lobe. Fig. 3 shows what happens when an imperfect adjustment is made. Here the intensity of the derived frequency $f_a$ is very much greater than the intensity of the derived frequency $f_b$ so that the reading of the differential meter 16 will be far from its center-point. Thus, by measuring the intensity of the signal at two points and adjusting the receiving device until equal responses are had, the exact center of the major lobe may be located.

What is claimed is:

1. The method of accurately determining the direction of an incoming signal having a wide band of equal amplitude frequencies which consists of transforming said incoming signal into a symmetrical lobe pattern centered about a particular frequency indicative of the angle of approach of said signal, modulating and filtering said signal to derive two narrow bands of frequencies spaced a given distance apart, rectifying said frequencies to derive direct currents therefrom, comparing the strength of said direct currents and altering the frequency of the current by which said signal is modulated until said direct currents prove to be equal to each other.

2. The method of accurately determining the direction of an incoming signal having a wide band of equal amplitude frequencies which consists of transforming said incoming signal into a pattern containing a major lobe and at least two equidistant and equal strength minor side lobes, said lobe pattern being centered about a particular frequency indicative of the angle of approach of said signal, determining the midpoint of said major lobe by comparing the strength of said minor lobes and adjusting the position of an indicating means until comparison of said minor lobes shows them to be of equal strength.

3. The method of accurately determining the direction of an incoming signal having a wide band of equal amplitude frequencies which consists of transforming said incoming signal into a pattern containing a major lobe in the direction of the incoming signal and at least two equidistant and equal strength minor side lobes, modulating said signal to derive frequencies corresponding to said side lobes, sharply filtering said frequencies, rectifying said frequencies to derive direct currents therefrom, comparing the strength of said direct currents and altering the frequency of the current by which said side lobe frequencies are modulated until said direct currents prove to be equal to each other.

4. The method of accurately determining the direction of an incoming signal having a wide band of substantially equal amplitude frequencies which consists of transforming said incoming signal into a pattern containing a major lobe in the direction of the incoming signal and at least two equidistant and equal strength minor side lobes, modulating said signal to derive from said side lobes a pair of given frequency signals, sharply filtering said derived signals, rectifying said filtered signals, operating a differential meter thereby and adjusting the modulating means until said differential meter shows the said derived signals to be of equal strength.

5. In a system for determining the direction of an incoming signal, a prismatic receiver for deriving from said incoming signal a frequency indicative of the angle of approach of said signal, a modulator connected to the output circuit of said receiver, a variable source of frequency for controlling said modulator, parallel paths leading from said modulator, sharply tuned filters and rectifiers in said paths, the tuning of said filters being different from each other and a differential meter for comparing the output of said rectifiers.

WARREN P. MASON.

REFERENCES CITED

The following references are of record in the file of this patent:

UNITED STATES PATENTS

| Number | Name | Date |
|---|---|---|
| 2,111,737 | Roberts | Mar. 22, 1938 |
| 2,268,587 | Guanella | Jan. 6, 1942 |
| 1,530,169 | Grimes | Mar. 17, 1925 |
| 1,711,101 | Shanck | Apr. 30, 1929 |
| 2,267,453 | Foster | Dec. 23, 1941 |